United States Patent [19]

De Ruyter et al.

[11] Patent Number: 4,831,734
[45] Date of Patent: May 23, 1989

[54] CUTTING APPLIANCE DESIGNED PARTICULARLY FOR MEDICAL DRESSINGS

[76] Inventors: Jackie A. De Ruyter, 32 rue de la Cigale, 68200 Mulhouse, France; Jean-Pierre De Ruyter, 2 rue des Anemones, 68500 Guebwiller, France; Daniel Burger, 32 rue de la Cigale, 68200 Mulhouse, France

[21] Appl. No.: 157,699

[22] Filed: Feb. 18, 1988

Related U.S. Application Data

[63] Continuation-in-part of Ser. No. 842,537, Mar. 21, 1986, abandoned.

[30] Foreign Application Priority Data

May 14, 1985 [FR] France ................. 85 07518
Dec. 1, 1985 [FR] France ................. 85 17978

[51] Int. Cl.[4] ............................................ B26B 27/00
[52] U.S. Cl. .......................................... 30/124; 30/278
[58] Field of Search ................. 30/124, 125, 162, 263, 30/275, 278, 286, DIG. 3; 83/510

[56] References Cited

U.S. PATENT DOCUMENTS 2,604,166  7/1952  Turner ........................... 30/124 X
4,360,970 11/1982  Ostroski et al. ............ 30/DIG. 3 X Primary Examiner—Frank T. Yost
Assistant Examiner—Michael D. Folkerts
Attorney, Agent, or Firm—Frishauf, Holtz, Goodman & Woodward

[57] ABSTRACT

The cutting appliance of the present invention features a pivotally connected upper (3) and lower casing (2), each having a pair of parallel sidewalls which, in closed position, contact the sidewalls of the other casing and clamp a band, strip, or web (18) or surgical dressing or the like on each side of a desired cutting line, a cutter blade (12) extending longitudinally within the lower casing and having an edge (13) parallel to, but spaced below, the plane (X—X') of contact of the casing sidewalls, and a bifurcated cursor (11) slidable within the upper housing and having a pair of jaws (17, 17') which apply pressure to the clamped band (18) on each side of the blade edge (13), thereby forcing it below the contact plane, onto the cutter blade edge (13).

3 Claims, 5 Drawing Sheets

CUTTING APPLIANCE DESIGNED PARTICULARLY FOR MEDICAL DRESSINGS

This application is a continuation-in-part of U.S. application Ser. No. 842,537, filed Mar. 21, 1986, now abandoned, claiming priority of French application Nos. 85/07518, filed May 14, 1985, and 85/17978, filed Dec. 1, 1985.

This invention relates to a cutting appliance which can be used for cutting any elongated sheet or band of flexible material in a direction transverse to the direction of elongation. A specific use of the invention is directed to the cutting of a strip or band of woven or superimposed fabrics, such as surgical dressings. Such dressings generally comprise several plies of absorbent fabric associated with a sheet of a self-adhesive band, the edges of which are protected by a sheet of paper. Such packs are difficult to cut with scissors, due to the various nature of the plies.

BACKGROUND

Many appliances exist for cutting bands; examples are described in U.S. Pat. Nos. 2,889,975 to HANLON and 3,138,985 to MILLS. However, in HANLON, a blade is punched through the band, which would be inoperative with surgical packs, whereas in MILLS, moving rolls press the band onto a blade, which has the effect of blunting the edge of the blade. The harder the pack is to cut, the faster the blade becomes dull.

THE INVENTION

Accordingly, one object of the invention is to cut a surgical pack, regardless of its thickness and the nature of its plies.

A further object is to cut a surgical pack without blunting of the cutting edge of the blade.

Yet another object is to provide an appliance for cutting surgical packs comprising only a housing, a common cutter blade in the housing, and a cursor for clamping and tensioning the pack on both sides of the blade to indirectly draw the pack against the blade edge and cut it, without the edge being subjected to any blunting tool.

Briefly, the cutting appliance of the present invention features upper and lower casings, each having a pair of parallel sidewalls which, in closed position, contact the sidewalls of the other casing and clamp a band, strip, or web on each side of a desired cutting line, a cutter blade extending longitudinally within the lower casing and having an edge parallel to, but spaced below, the plane of contact of the casing sidewalls, and a bifurcated cursor slidable within the upper housing and having a pair of jaws which apply pressure to the clamped band on each side of the blade edge, thereby forcing it below the contact plane, onto the cutter blade edge.

DRAWING

These and other objects will be apparent from the following description of one embodiment of the invention, with reference to the attached drawings.

DETAILED DESCRIPTION

Figure 1:
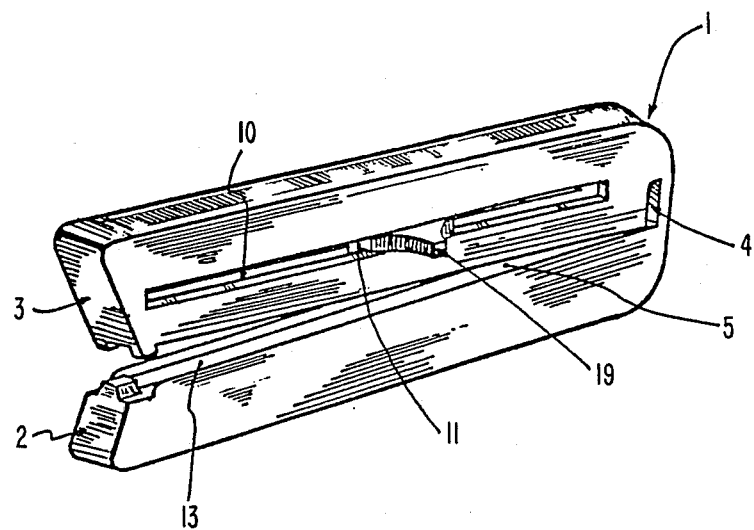
FIG. 1 is a perspective view of the appliance of the invention when not in use.
Figure 2:
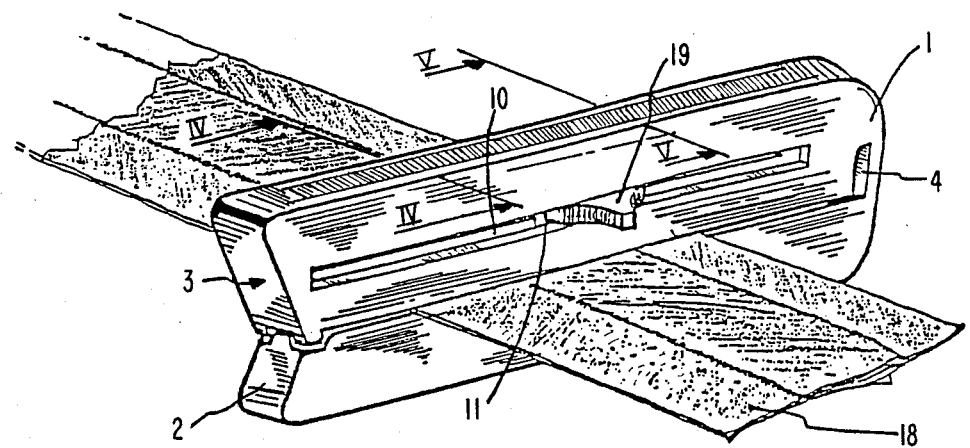
FIG. 2 is similar to FIG. 1, showing the two casings of the housing pressed upon a band to cut.
Figure 3:
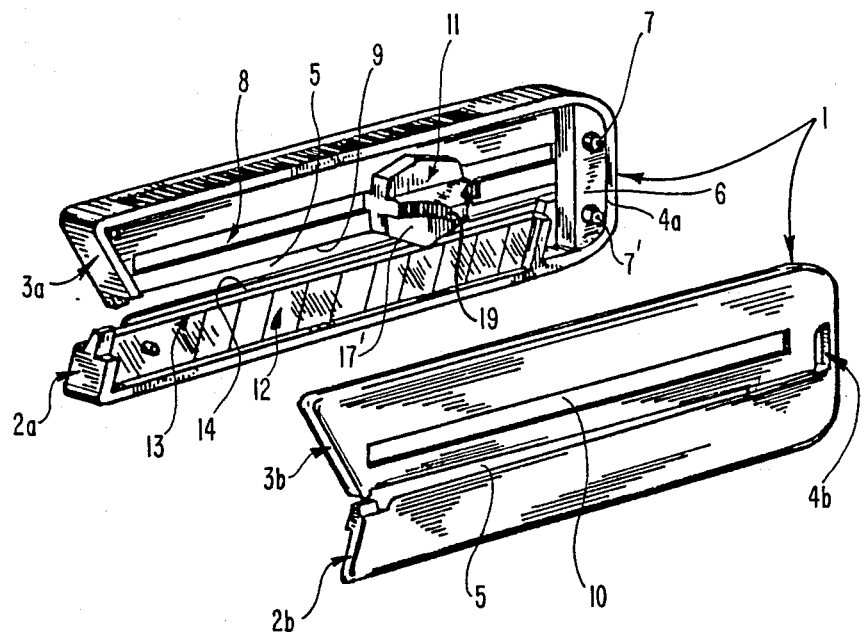
FIG. 3 is an exploded view of the same appliance, showing the assembly of the housing.

As shown on FIG. 3, the appliance comprises a housing 1 formed of two halves 2a-3a and 2b-3b, each half being molded in one piece of plastic material in this example. The halves are assembled as shown in FIG. 1 by welding of the external edges thereof. When assembled, the halves form two elongated casings 2a-2b and 3a-3b, slightly diverging and connected at their rear ends by a comparatively flexible portion 4a-4b. When not in use, the casings 2a-2b and 3a-3b are spaced along an elongated, slightly diverging slot 5. A piece 6, provided in the rear portion 4a-4b and connected to the portion 4b by pins 7—7', limits the opening of the slot.

An elongated groove 8 is provided in the inner face of portion 3a, parallel to the upper edge 9 of the slot 5, and an elongated slit 10 is provided in portion 3b, in a position just facing groove 8. Groove 8 and slit 10 define guide means for a cursor 11, longitudinally movable along the interior of housing 1 between the inner faces of the portions 3a and 3b, as will be further described with reference to FIGS. 4 and 5.

Figure 4:
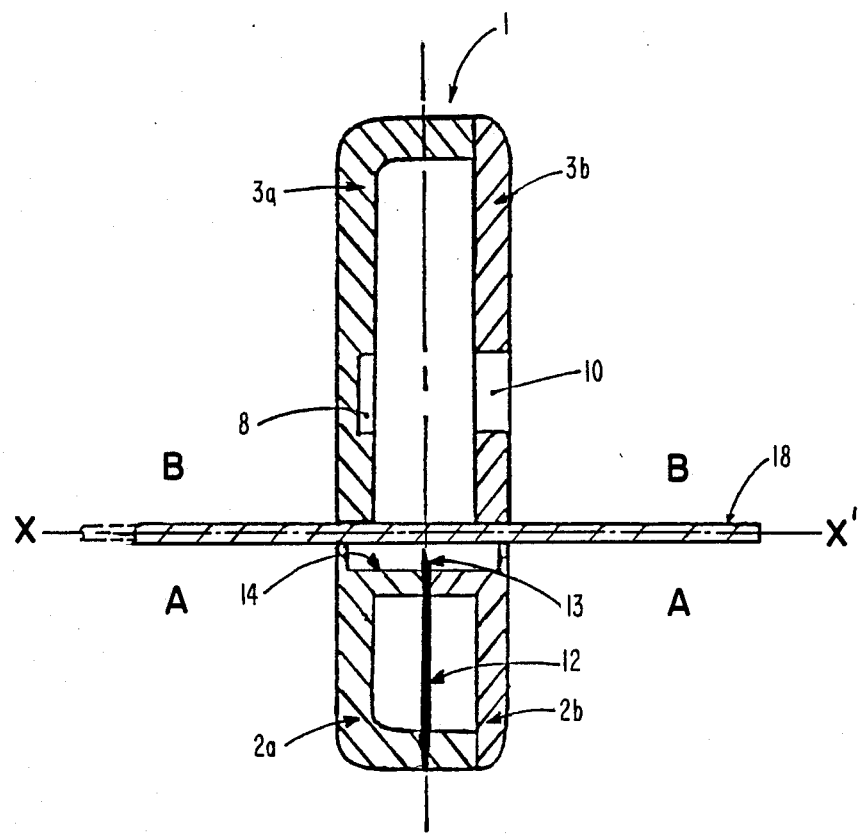
FIGS. 4 and 5 are transverse sections of FIG. 2 along lines IV—IV and V—V.

As shown in FIG. 4, a cutter blade 12 is fixed in lower portion 2a of housing 1, so that the cutter edge 13 is parallel to the upper face 14 of portion 2a.

As shown on FIGS. 2, 3, 4, and 5, when casing 2a-2b is pressed onto casing 3a-3b in closed position, the edges 9 and 14 define a contact plane X—X', which separates a first region A, below plane X—X', from a second region B, above that plane.

According to this invention, the cutting edge 13 of the blade 12 is located in region A, that is, below plane X—X'.

Figure 5:
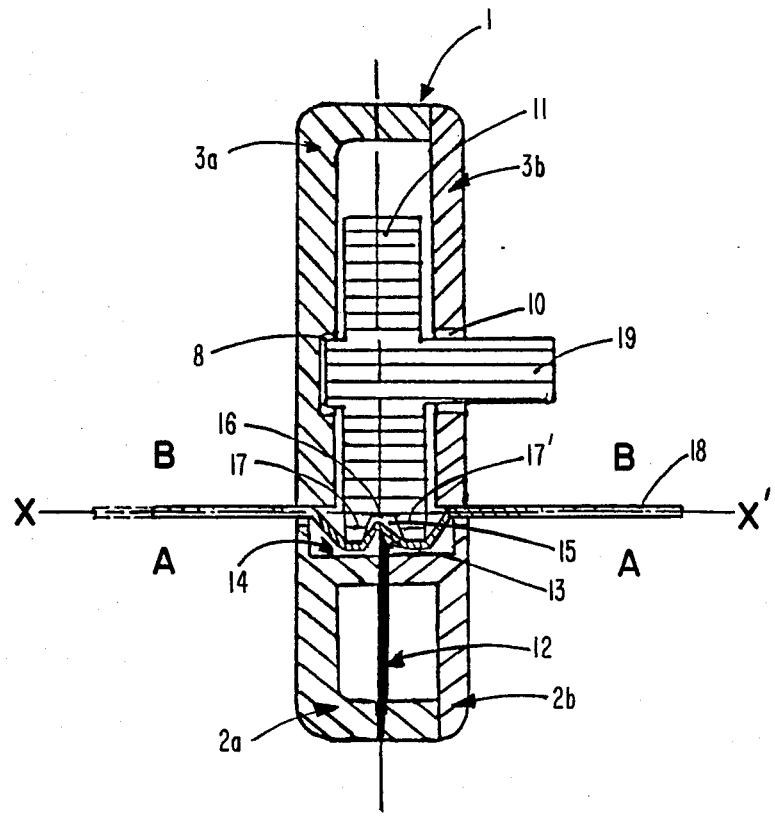

As shown in FIG. 5, cursor 11 is formed with a groove 15 defined by a connecting element 16 and two parallel jaws 17, 17'. When housing 1 is in a closed position, the jaws extend from second region B through contact plane X—X' into the first regions A, flanking cutter edge 13. Cutter edge 13 is aligned with, and faces, connecting element 16 of groove 15, but is spaced therefrom and avoids contact therewith.

When a band 18 to be cut is placed in slot 5 between the casings 2a-2b, 3a-3b and the appliance is closed, the band is pinched above the cutting edge 13, as shown in FIG. 4. No cutting action is therefore exerted upon the band, which is only immobilized or clamped.

Cursor 11 is slidable along guide means 8, 10 by manually grasping a tap or pin or handle 19 which projects from housing 1 through slit 10. As shown in FIG. 5, when cursor 11 is slidably moved from the rear end 4 of the appliance toward the front end, jaws 17—17' will depress the portions of the band on each side of cutter edge 13 below plane X—X', and thereby pull the intermediate portion of the band onto cutter edge 13, without pressing any inflexible, dulling object onto the cutter edge. Due to this action, the portion 20 of the band between said jaws is drawn onto the edge and cut thereby, without the edge being damaged by the blunting action of any tool.

Those skilled in the art will appreciate that various changes and modifications are possible within the scope of the inventive concept. For example, instead of a moving grooved cursor 11 and a stationary blade 12, a moving blade and a stationary grooved member could be used. Similarly, a cutter wheel could be used instead of a linear blade, and so forth. Accordingly, the invention is not restricted to the single embodiment shown and described, but rather is defined by the appended claims.

We claim:

1. A cutting appliance for cutting an elongated band (18) in a direction transverse to the direction of elongation, comprising a housing (1) including first (2a-2b) and second (3a-3b) elongated casings, pivotably connected to one another about a pivot axis (4a-4b), said casings being movable between an open position, in which said elongated band (18) is freely movable, and a closed position, in which said casings define first (A) and second (B) regions respectively located on opposite sides of said band and define a contact plane (X—X'), so that said band is clamped between said first and second casings, a cutting blade (12) having an elongated cutting edge (13) located in said first region (A), being mounted in the first elongated casing (2a-2b), and spaced from said contact plane (X—X'), elongated guide means (8,10), disposed in said second elongated casing (3a-3b), parallel with said cutting edge (13); and a cursor element (11), facing said elongated cutting edge, being slidably mounted in said guide means so as to be parallel with and face said cutting edge (13), said cursor element being formed with a groove (15) defined by a connecting element (16) and two parallel jaws (17, 17'), said jaws in said closed position extending from the second region (B) beyond said contact plane (X—X') into said first region (A), said cutting edge (13), while facing the connecting element (16) of said groove (15), being spaced from the connecting element of said groove to avoid contact therewith, so that said cursor exerts only a pressure on said band on each side of said cutting edge, without applying any pressure directly to said cutting edge.

2. The cutting appliance of claim 1, further comprising means (19) for moving said cursor (11) transversely with respect to said band, thereby severing said band.

3. The cutting appliance of claim 2, wherein said moving means (19) comprise a handle extending from said cursor (11) perpendicularly with respect to an axis of movement of said cursor.

* * * * *